United States Patent [19]

Madrid et al.

[11] Patent Number: 5,717,911
[45] Date of Patent: Feb. 10, 1998

[54] RELATIONAL DATABASE SYSTEM AND METHOD WITH HIGH AVAILABILITY COMPLIATION OF SQL PROGRAMS

[75] Inventors: Louise M. Madrid, Los Gatos; Richard A. Meier, Campbell; Franco Putzolu, Menlo Park; Sunil Sharma, San Jose; Thomas J. O'Shea, Cupertino; James H. Troisi, Sunnyvale; Hansjorg Zeller, Los Altos, all of Calif.; Gary M. Gilbert, Arlington Heights, Ill.; Donald S. Maier, Campbell; Elizabeth G. Davis, Palo Alto, both of Calif.; Pedro Celis, Austin, Tex.

[73] Assignee: Tandem Computers, Inc., Cupertino, Calif.

[21] Appl. No.: 377,287

[22] Filed: Jan. 23, 1995

[51] Int. Cl.$^6$ .................................................. G06F 17/30
[52] U.S. Cl. .................... 395/602; 395/611; 395/612; 395/700; 364/282.1; 364/280.4; 364/DIG. 1
[58] Field of Search .................................. 395/600, 611, 395/612, 602, 601; 364/282.1, 283.4

[56] References Cited

U.S. PATENT DOCUMENTS

| | | | |
|---|---|---|---|
| 5,201,046 | 4/1993 | Goldberg et al. | 395/611 |
| 5,379,419 | 1/1995 | Heffernan et al. | 395/604 |
| 5,504,885 | 4/1996 | Alashqur | 395/705 |
| 5,511,190 | 4/1996 | Sharma et al. | 395/601 |

FOREIGN PATENT DOCUMENTS 96300430  5/1996  European Pat. Off. .

OTHER PUBLICATIONS

"The Basic Principles of Query Optimization in Relational Database Management Systems"; J. Freytag; Information Processing 89, San Francisco, (Aug. 28–Sep. 1, 1989); No. Congress 11; pp. 801–807.

*Primary Examiner*—Thomas G. Black
*Assistant Examiner*—Greta L. Robinson
*Attorney, Agent, or Firm*—Flehr Hohbach Test Albritton & Herbert LLP

[57] ABSTRACT

An SQL program executor and an SOL compiler both include options for avoiding recompilations of execution plans whenever the runtime object and the compile time object referenced by an execution plan meet predefined schema similarity criteria. Thus, recompilation is sometimes avoided even though the compile time object has been altered or the run time object is not the same object as the compile time object. To enable late binding, schema information is stored in each execution plan for each object to be accessed by the execution plan. The stored schema information is a subset of the full object schema, and includes information about all the aspects of the objects to be accessed which must remain unchanged in order for the execution plan to be operable. While executing a compiled program, the SQL executor avoids recompilations of execution plans whenever the runtime object and the compile time object referenced by an execution plan meet predefined schema similarity criteria. When a recompilation of an SQL program is required, only the execution plans which do not meet the schema similarity criteria are recompiled if the compiled program has been assigned appropriate runtime parameters. The late binding features of the SQL executor also enable a compiled program to access objects distinct from the objects referenced by the program at compile time. Similarly, the SQL compiler includes the ability to recompile only those execution plans which do not meet the schema similarity criteria and thus are inoperable.

24 Claims, 12 Drawing Sheets

Runtime Properties
┌164

| ProgramName | —284 |
| OwnerID | —285 |
| CreateTime | —286 |
| RecompileTime | —287 |
| Valid (flag) | —288 |
| AutoCompile (flag) | —289 |
| RecompileMode | —290 |
| CheckMode | —291 |
| SimilarityInfo (flag) | —292 |
| Other Parameters | —293 |

| FIGURE 7A | FIGURE 7B |

RELATIONAL DATABASE SYSTEM AND METHOD WITH HIGH AVAILABILITY COMPILATION OF SQL PROGRAMS

The present invention relates generally to relational database management systems that utilize compiled SQL programs, and particularly to a relational database management system in which a compiled program for accessing a particular database can continued to be used, without recompilation, even when the schema of the database has been changed since compilation of the program, when certain schema similarity criteria are met.

BACKGROUND OF THE INVENTION

Many commercial database systems, especially those designed for heavy transaction rates, optimize the performance of database queries initiated by end users through the compilation of database queries into compiled execution plans. Programs containing these compiled execution plans are called SQL or database compiled programs. The use of compiled execution plans can reduce the computer resources utilized for executing database queries, and is especially beneficial for tasks performed often, such as account debit, credit and balance queries performed by banks.

However, a counterbalancing problem associated with the use of compiled execution plans is that program recompilations, caused by changes in the structure of the database tables being accessed, can affect performance of a database system and can cause temporary user outages.

In the Tandem® NonStop™ SQL/MP relational database management system (DBMS), prior to the present invention compiled programs were often configured for recompilation whenever any aspect of the schema of any of the database tables accessed by the programs were changed. Recompilation is often necessary, for instance because a table that was previously not partitioned has grown sufficiently large to require partitioning.

It has been observed by the inventory, however, that in many instances, database schema changes do not absolutely require recompilation of the execution plans used to access the tables whose schemes have been altered. While recompilation might improve execution performance of the programs, for some database users the temporary user outages caused by automatic recompilation are more disruptive than the loss of execution efficiency caused by using an old program execution plan. In other cases no performance benefit would be obtained from recompilation.

Another observation by the inventors is that the changes to Tandem® NonStop™ SQL/JMP relational DBMS (database management system) required to reduce recompilations could be extended to provide two additional benefits. First, with appropriate changes to the SQL executor in the DBMS, compiled programs for accessing a first object could be used (without recompilation) to access a second object whose schema is the same as that of the first object with respect to all columns and indices used by the compiled program. Second, compilations of programs could be made more efficient by adding a compiler option for recompiling only "inoperable" execution plans, while leaving other execution plans in a program unchanged.

It is therefore a primary object of the present invention to enable a relational database using compiled database query statements to distinguish between database schema changes requiring recompilation of the query statements that access the changed database tables and those database schema changes that do not require query recompilation. It is an associated object of the primary invention to provide for storage of sufficient information in or with compiled query statements and database tables to enable such determinations to be made efficiently.

Another object of the present invention is to enable a database query statement initially compiled for accessing a first set of database tables to be utilized, without recompilation, to access a second set of database tables when the portions of the first and second sets of database tables accessed by the compiled query statement are structurally similar.

Yet another object of the present invention is to shorten query program recompilation time by recompiling only those statements of a program whose execution plans are inoperable, while not recompiling those statements of the program whose execution plans are operable even when recompiling those statements might improve execution efficiency.

SUMMARY OF THE INVENTION

In summary, the present invention is an improved program execution procedure and an improved program compiler, both of which include options for avoiding recompilations of execution plans whenever the runtime object to be accessed by the compiled program and the compile time object referenced by an execution plan meet predefined structural similarity criteria. Thus, recompilation is sometimes avoided even though the compile time object referenced by a program has been altered or the run time object referenced by the program is not the same object as the compile time object.

To enable the "similarity check" and "late binding" features of the present invention, schema information is stored for each execution plan for each object to be accessed by the execution plan. The stored schema information is a subset of the full object schema, and includes information about all aspects of the object to be accessed that must remain unchanged in order for the execution plan to be operable, as well as object and file identification information that can change without making the plan inoperable.

While executing a compiled program, the program execution procedure avoids automatic recompilations of execution plans (at runtime) whenever the runtime object and the compile time object referenced by an execution plan meet predefined schema similarity criteria. When a runtime recompilation of a program is required, only the execution plans which do not meet the schema similarity criteria are recompiled if the compiled program has been assigned the appropriate runtime parameters. The late binding features of the present invention also allow a compiled program to access objects distinct from the objects referenced by the program at compile time.

Similarly, the recompilation procedure of the present invention recompiles at "static compilation time" (i.e., in response to an explicit operator compilation command) only those execution plans which do not meet the schema similarity criteria and thus are inoperable.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
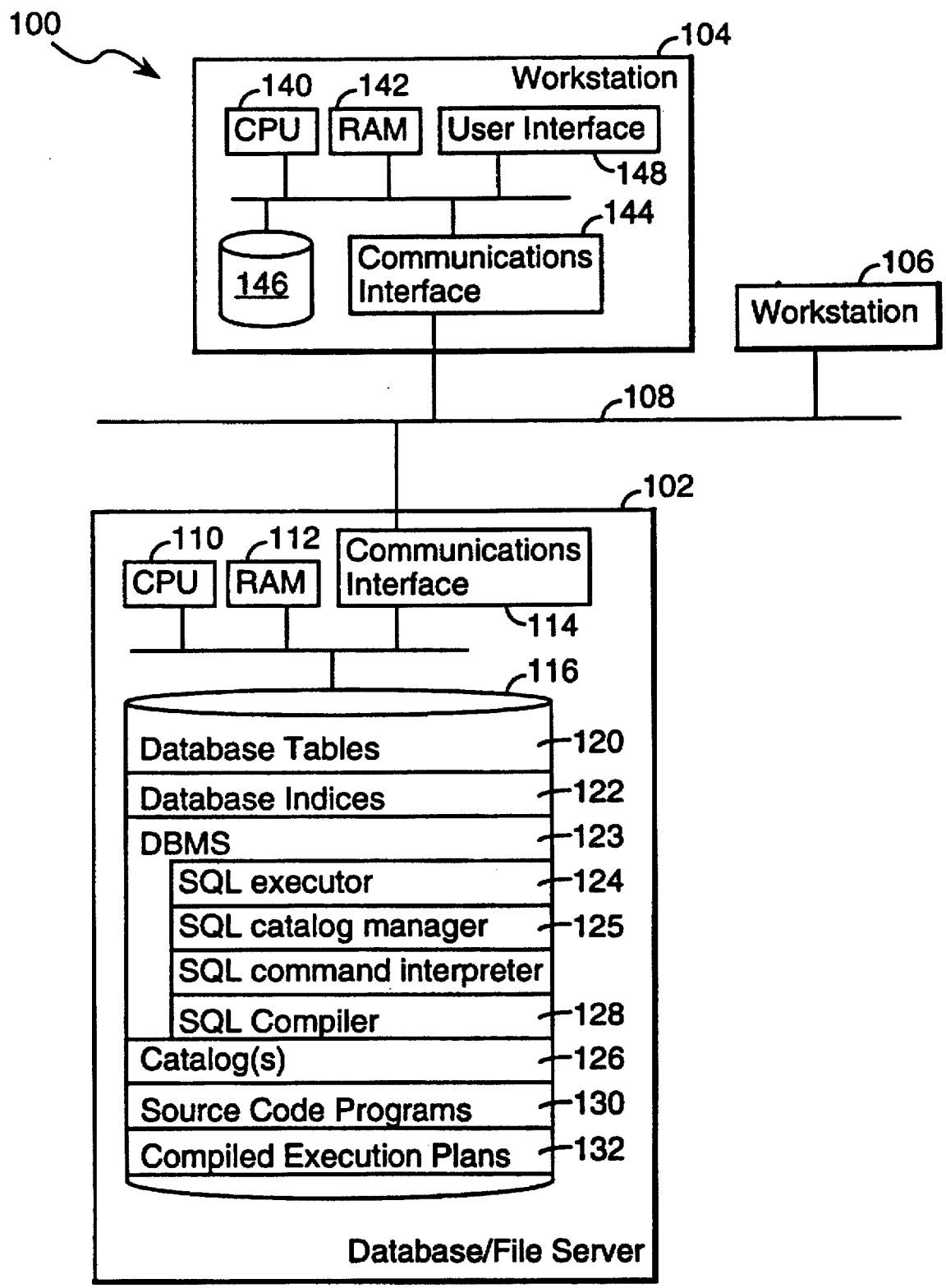
FIG. 1 is a block diagram of a computer system for storing and providing user access to data in stored databases.

Referring to FIG. 1, there is shown a computer system 100 for storing and providing user access to data in stored databases. The system 100 is a distributed computer system having multiple computers 102, 104, 106 interconnected by local area and wide area network communication media 108. The system 100 generally includes at least one database server 102 and many user workstation computers or terminals 104, 106.

When very large databases are stored in a system, the database tables will be partitioned, and different partitions of the database tables will often be stored in different physical disks controlled by different CPUs. However, from the viewpoint of user workstation computers 104, 106, the database server 102 appears to be a single entity. The partitioning of databases is well known to those skilled in the art.

As shown in FIG. 1, the database server 102 includes a central processing unit (CPU) 110, primary memory 112, a communications interface 114 for communicating with user workstations 104, 106 as well as other system resources not relevant here. Secondary memory 116, typically magnetic disc storage, in the database server 102 stores database tables 120, database indices 122, a database management system (DBMS) 123 for enabling user and operator access to the database tables, and one or more catalogs 126 for storing schema information about the database tables 120 as well as directory information for programs used to access the database tables. The DBMS 123 includes an SQL executor 124 as well as other database management subsystems, such as an SQL catalog manager 125 and an SQL command interpreter. The DBMS 123 further includes an SQL compiler 128 for compiling source code database query programs 130 into compiled execution plans 132. The SQL compiler 128 can also be used to compile any specified SQL statement so as to generate an execution plan.

End user workstations 104, 106, typically include a central processing unit (CPU) 140, primary memory 142, a communications interface 144 for communicating with the database server 102 and other system resources, secondary memory 146, and a user interface 148. The user interface 148 typically includes a keyboard and display device, and may include additional resources such as a pointing device and printer. Secondary memory 146 is used for storing computer programs, such as communications software used to access the database server 102. Some end user workstations 106 may be "dumb" terminals that do not include any secondary memory 146, and thus execute only software downloaded into primary memory 142 from a server computer, such as the database server 102 or a file server (not shown).

GLOSSARY

To assist the reader, the following glossary of terms used in this document is provided.

SQL: SQL stands for "Structured Query Language." Most commercial database servers utilize SQL. Any program for accessing data in a database which utilizes SQL is herein called an "SQL Program." Each statement in an SQL program used to access data in a database is called an "SQL statement." An SQL program contains one or more SQL statements.

Execution Plan: An SQL statement which has been compiled into an intermediate form that specifies a method to efficiently access data in a database.

Execution Characteristics: Characteristics of an execution plan that have no effect on its semantics (i.e., operability). Examples are the performance of a plan, and its resource consumption.

Object(s): An object is a file, database table or other encapsulated computer resource accessed by a program as a unitary structure. In the context of the preferred embodiment, objects are database tables. In other implementations of the present invention, objects may be other encapsulated computer resources which the end user accesses indirectly through validated methods (i.e., programs) designed specifically to access those computer resources.

DDL Statement: a data definition language statement. DDL statements are used to create and modify database object (e.g., tables and indices).

DEFINE name: An object handle or link indicating an object to be accessed by an execution plan. An SQL statement may reference objects via a DEFINE names, instead of referencing them directly. This enables the operator to redirect the program to access a different set of objects than the compile-time objects, without having to alter the program, by merely altering the DEFINE names to point to new objects before executing the program.

Source Code Program/Statement: For each execution plan there is a corresponding source code SQL statement. A source code program is the set of SOL statements corresponding to a set of execution plans which together are herein called a "compiled program."

SQL compilation: The act of compiling an SQL statement program or an SOL program. The compilation can be a "static" compilation, performed by invoking an SQL compiler, such as Tandem® SQLCOMP™, to generate new execution plans for SQL statements in the program. An SQL compilation can also be a dynamic compilation, such as an automatic recompilation initiated due to a program being marked invalid or due to timestamp mismatch between an SOL statement and an object referenced by the statement.

Inoperable plan: An execution plan that is semantically incorrect. Executing such a plan may lead to incorrect results. A plan may be inoperable because the structure of the database table(s) being accessed by the plan has changed.

Invalid plan: In theory, an invalid plan is one that is either semantically incorrect (i.e., inoperable) or one whose execution characteristics, such as performance, are sufficiently different from what they would be if the source code statement corresponding to the plan were recompiled. The latter plan is operable but not optimal. In practice, in accordance with the present invention, a plan is considered to be invalid (and thus in need or recompilation) if an object it references has been changed by any of a certain set of "DDL operations." For a statement that uses execution-time name resolution, a plan is also considered invalid if it is used to access a different object than the compile-time object referenced by the statement when the plan was generated.

Invalid program: An SQL program whose file label (i.e., a data structure in the file's header) has been marked "invalid" by a DDL operation, or a program that is started with DEFINE statements pointing to different objects than the compile-time objects.

Invalid statement: An SOL statement whose current execution plan is invalid.

Name resolution: The process of resolving the object names of objects to be accessed by an execution plan by "expanding" DEFINE names using predefined name resolution and default name rules.

Binding: an execution plan is said to be bound to a database table when the identity of the database table to be accessed by the execution plan is determined by a process called "name resolution."

Late binding: refers to a characteristic of the present invention, in which execution plans are bound to database objects at run time (as opposed to compile time), when the plan is executed, whenever the appropriate run time parameters are stored in the execution plan and database objects.

Optimal plan: An operable plan that is the most efficient plan to process the statement against a given set of database objects.

High availability compilation: a procedure in which only the execution plans with an SOL program that are inoperable are recompiled, while leaving unchanged other execution plans that may not be optimal.

Redefinition timestamp: In accordance with the present invention, an SOL object has a redefinition timestamp that is changed each time an invalidating DDL operation is performed on the object. The SQL executor uses the timestamp to identify execution plans that may be invalidated by the DDL operation.

Similarity Check: Comparison of schema information stored in a compiled execution plan for a referenced object with a subset of the referenced object's current schema information. When a similarity check passes, the compiled execution plan is operable, even if the referenced object has been restructured. When a similarity check fails, the compiled execution plan is inoperable and the statement corresponding to a compiled execution plan requires recompilation.

End user: a person using a workstation to access database information in a database server. End users typically do not have the authority to modify the structure of database tables.

Operator: a person using a workstation who has the authority and access rights to modify the structure of database tables and to manually initiate compilation of SOL source code programs.

Database Server

Figure 2:
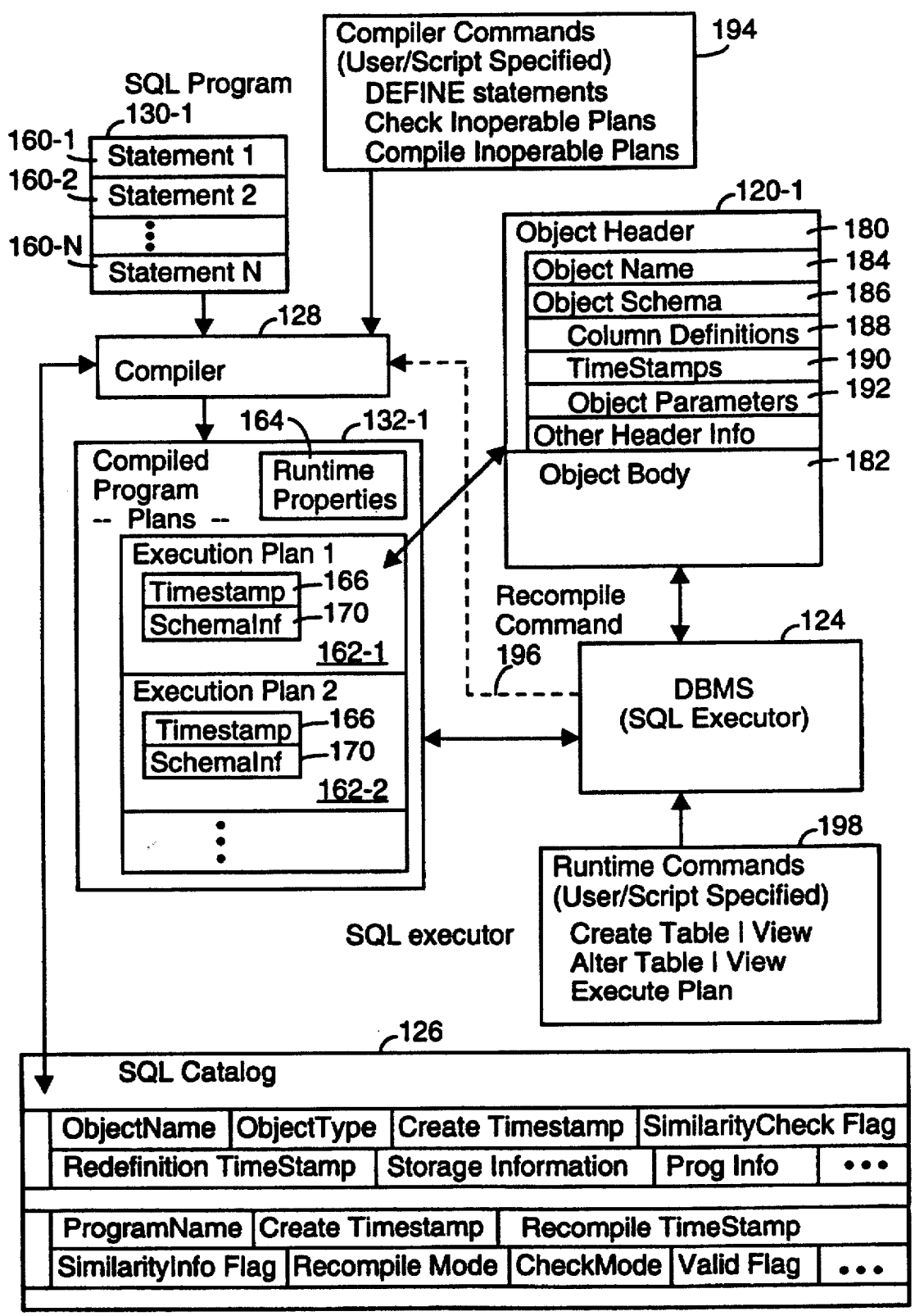
FIG. 2 is a block diagram of data structures stored in a database management system in accordance with the present invention.

FIG. 2 depicts some of the interrelationships between the data structures and programs stored in the database server 102.

A source code program 130-1 includes a sequence of SQL source code statements 160 as well as other non-SQL source code statements (e.g., assignments, and program flow control statements). SQL compiler 128 compiles the SQL source code statements into a compiled program 132-1 having a sequence of compiled statements 162 herein called execution plans. Each source code statement 160 has a corresponding execution plan 162. The compiled program 132 includes a "file label" 164 (i.e., a data structure in the program) that stores a set of runtime properties used by the SQL executor 124, as will be discussed in more detail below. In addition, each execution plan 162 includes, in addition to the compiled query, a timestamp 166 and a set of schema information 170 for each of the database objects to be accessed by that execution plan.

Each database table or object 120 includes a "disk label" 180, herein called an object header, and an object body 182. The object header 180 stores information about the structure, identity and other characteristics of the database object 120, while the object body stores the data content of the database object. The object header 180 includes an object name field 184 and an object schema 186 defining the structure and other characteristics of the data in the database object. The object schema 186 stored in the database object's "disk label" 180 is a compact representation of the catalog information stored for the database table in the SQL catalog 126 and thus includes data attribute definitions 188, timestamps 190 and other object parameters 192.

The catalog 126 is itself a database having a set of tables for storing information about the database objects (e.g., tables and indices) stored in the database server as well as information about the programs stored in the database server. The structure of the catalog 126 will be described in more detail with reference to FIGS. 3 and 4A through 4H.

The compiler 128, as mentioned above, compiles an SQL program 130 into a compiled SQL program 132 having a set of execution plans 162. Operation of the compiler is initiated by either a manually entered compiler command 194 or a recompile command 196 generated by the SQL executor 124 when it attempts to execute an invalid or inoperable execution plan. Automatic recompilations are one of the primary subjects of the present invention, and will therefore be discussed in more detail later. Manually initiated compilations are governed by user or operator entered commands 194 or, more commonly, user or operator initiated scripts that contain sequences of data definition and compiler commands. New compiler commands provided by the preferred embodiment of the present invention, and the corresponding operations performed by the compiler 128, will be discussed below with reference to FIG. 8.

The SQL executor 124 responds to both end user and operator runtime commands 198. Such runtime commands include standard end user initiated plan execution commands, such as to retrieve data from database tables and to add data to database tables. Runtime commands 198 also include DDL statements, for creating database tables and for modifying the structure of existing database tables, although the authority to use these runtime commands 198 is usually restricted to a set of persons herein called operators.

Catalog and Disk Label Data Structures

Figure 3:
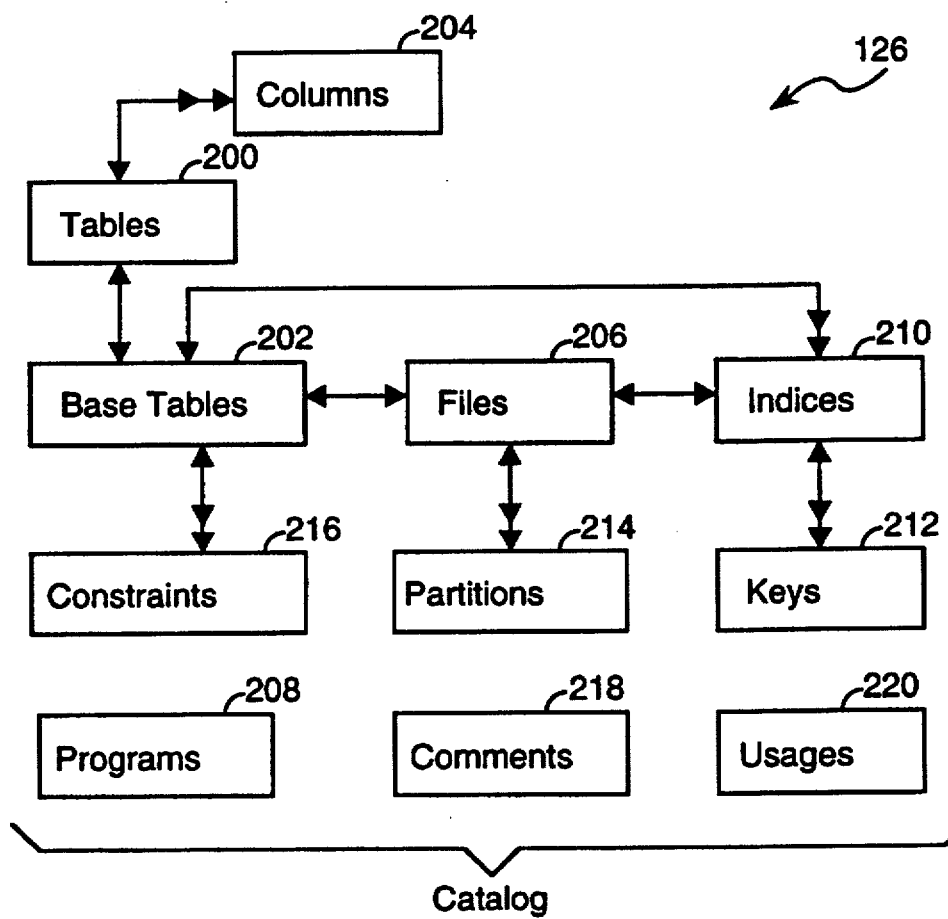
FIG. 3 is a block diagram of the catalog data structure, representing database tables and programs, shown in FIG. 2.

Referring to FIG. 3, the catalog 126 in the preferred embodiment, consists of a set of tables 200–220 representing database tables and programs in a database server or set of database servers. Since similar database catalogs are provided in the prior art and are known to those skilled in the art, only the features of the catalog 126 relevant to the present invention will be discussed here.

Figure 4A:
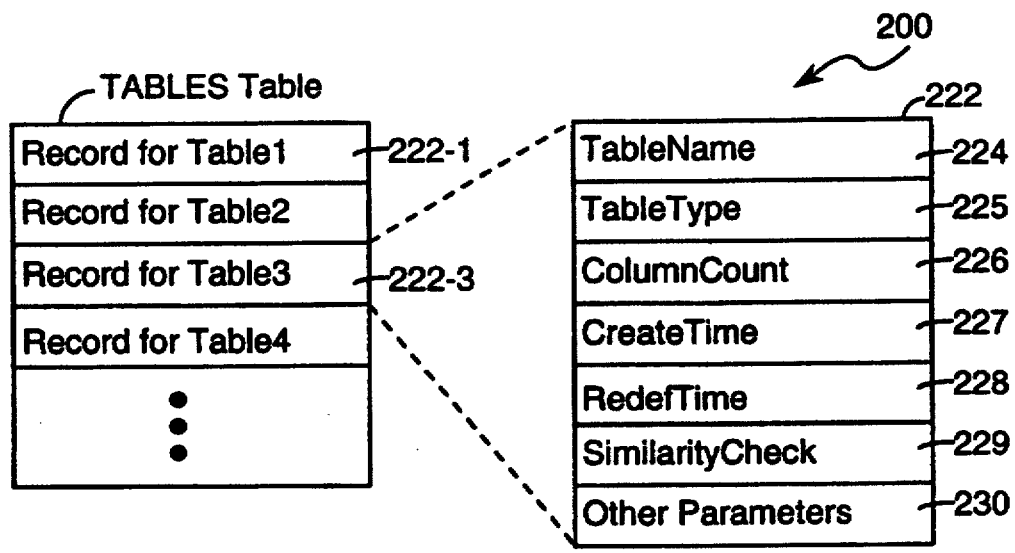
FIGS. 4A–4H are block diagrams representing portions of the tables included in the catalog data structure of FIG. 3.

Referring to FIG. 4A, the "Tables" table 200 includes one record 222 for each database table in the database server. Each record 222 includes the following fields:

TableName 224, denoting the name of the database table;

TableType 225, indicating whether the referenced database table is a true database table or a "view," which is a subset of one or more database tables that are referenced in the same manner as a database table by SQL statements;

ColumnCount 226, indicating the number of distinct columns in the table (or view);

CreateTime 227, is a timestamp value indicating when the table (or view) was first created;

RedefTime 228, is a timestamp value indicating when the table (or view) was last altered;

SimilarityCheck 229, is a flag whose value is Enabled when similarity checks on the table are allowed and is Disabled otherwise; and other parameters 230 not relevant here.

Figure 4B:
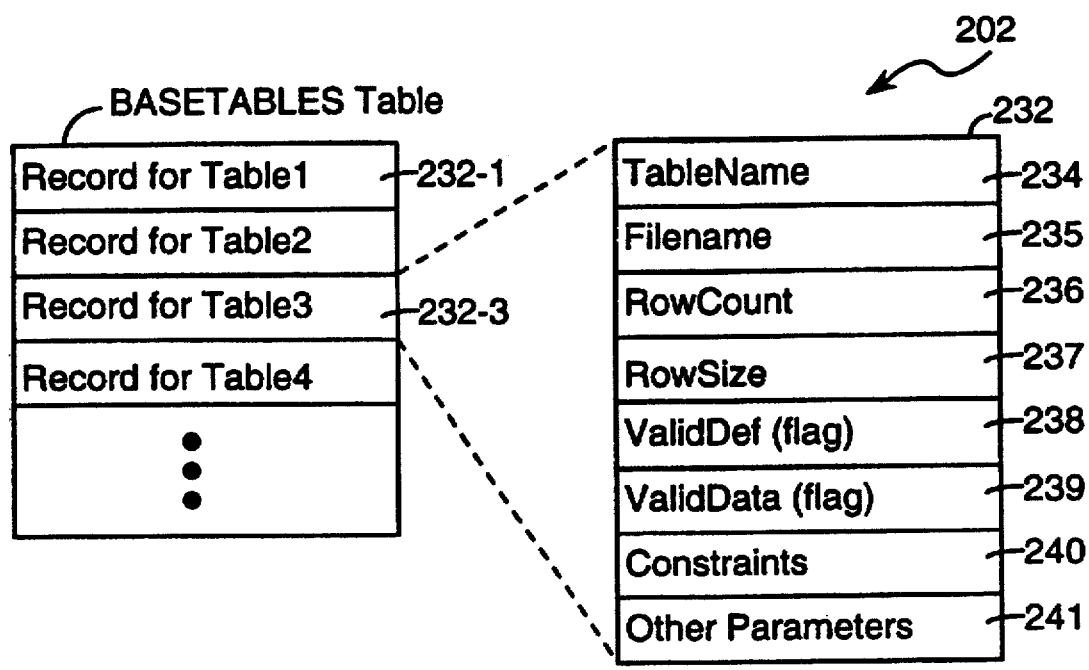

Referring to FIG. 4B, the "Base Tables" table 202 includes one record 232 for each database table in the database server. Each record 232 includes the following fields:

TableName 234 denoting the name of the database table;

FileName 235, indicating the name of the disk file in which the referenced database table is stored;

RowCount 236, indicating the number of rows in the table;

RowSize 237, indicating the maximum size (in bytes or words) of each row;

ValidDef 238, is a flag (Y or N) value indicating if the file has a valid definition, correct file label and catalog entries;

ValidData 239, is a flag (Y or N) value indicating if the data in the table is consistent with data in the table's indexes and satisfies constraints on the table;

Constraints 240, is a flag (Y or N) value indicating whether the table has any defined constraints; and other parameters 241 not relevant here.

Figure 4C:
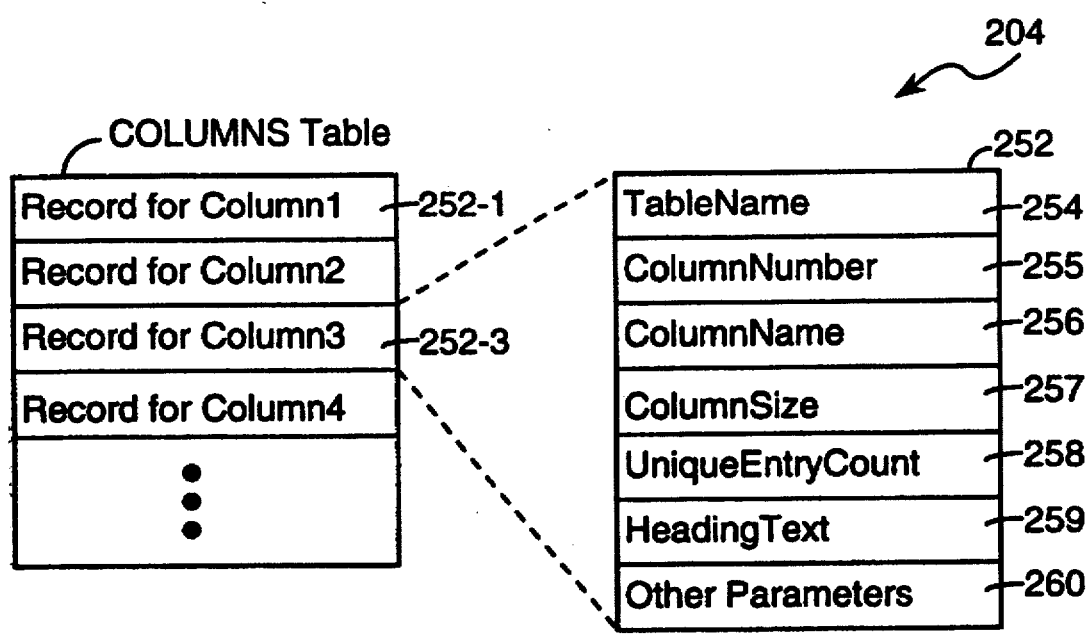

Referring to FIG. 4C, the "Columns" table 204 includes one record 252 for each column of each database table in the database server. Each record 252, representing characteristics of one database table column, includes the following fields:

TableName 254, denoting the name of the database table in which the column corresponding to this record 252 resides;

ColumnNumber 255, denotes a number indicating the position of the column in each row of the table, where the first column has a ColumnNumber of 0;

ColumnName 256, denotes the column's name, also called the SQL identifier, for the column;

ColumnSize 257, indicating the size (in bytes or words) of the data in the column;

UniqueEntryCount 258, denotes the number of unique data entries in the column for the table or table partition;

HeadingText 259, denotes a text string used as a default column heading when printing data extracted from this the column of the database table; and other parameters 260 not relevant here.

Figure 4D:
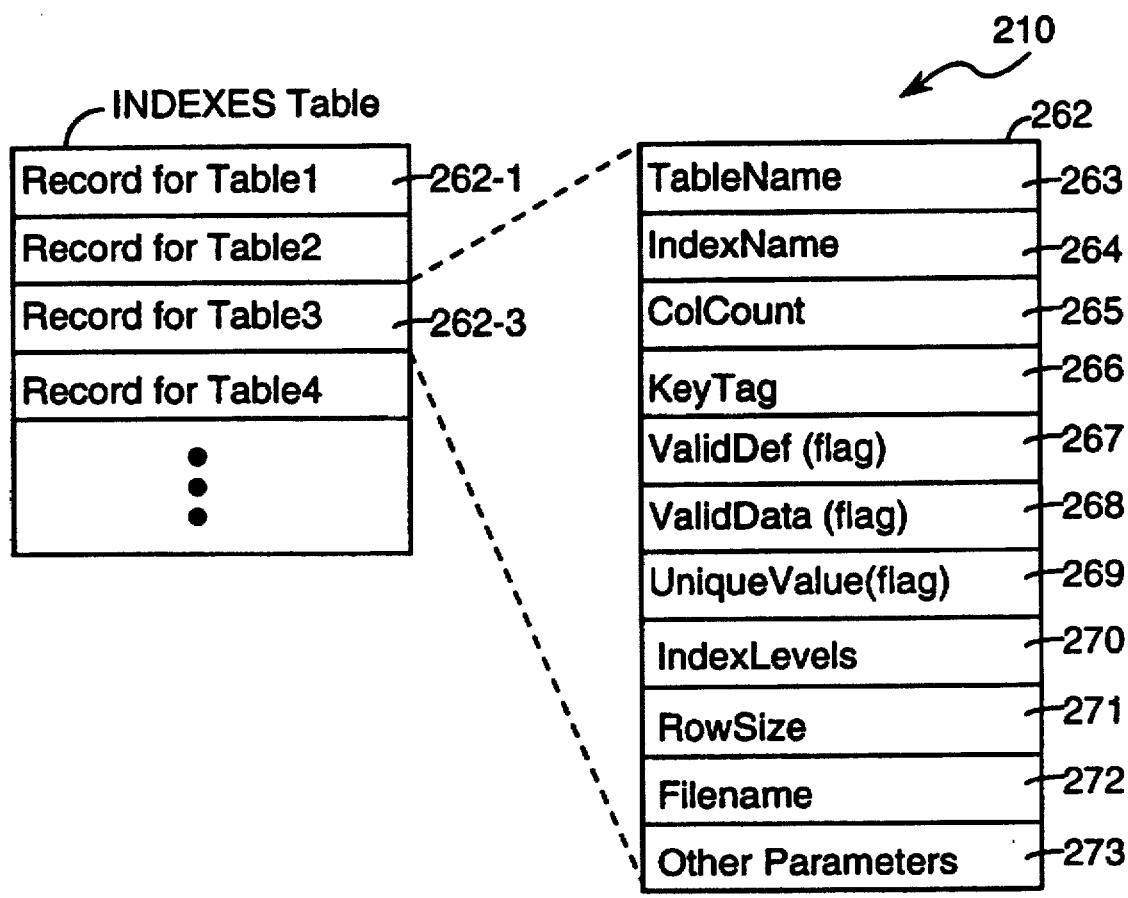

Referring to FIG. 4D, the Indexes table 210 includes one record 262 for each database index in the database server. Each record 262 includes the following fields:

TableName 263 denoting the name of the database table;

IndexName 264, indicating the name of the index;

ColCount 265, indicating the number of columns used in the index, including the primary key columns;

Keytag 266, specifying the keytag, if this is primary key index for the database table;

ValidDef 267, is a flag (Y or N) value indicating if the index definition is valid;

ValidData 268, is a flag (Y or N) value indicating if the index has valid data;

UniqueValue 269, is a flag (Y or N) value indicating whether all entries in the index are unique;

IndexLevels 270, indicating the number of levels of indexing in this index;

RowSize 271, indicating the size of each index record;

FileName 272, indicating the file that contains the index; and other parameters 273 not relevant here.

Figure 4E:
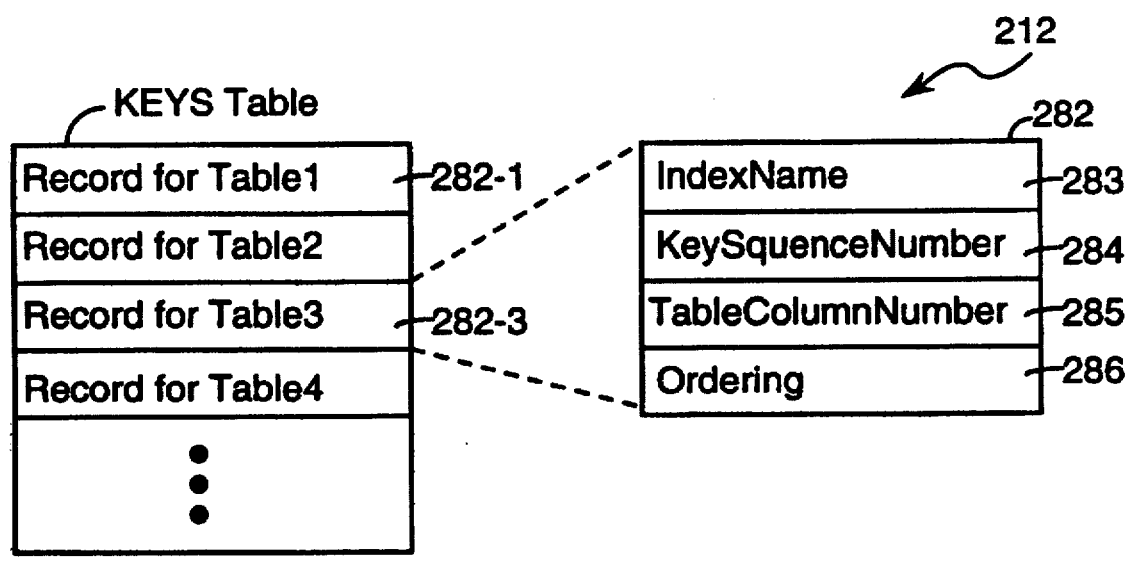

Referring to FIG. 4E, the Keys table 212 includes one record 282 for each column of the primary key and each other index for each database table in the database sewer. Each record 282, representing one table column for one key or index, includes the following fields:

IndexName 283, denoting the name of the index;

KeySequenceNumber 284, indicates the position of the column in each index row;

TableColumnNumber 285, indicates the position of the column in each table row; and Ordering 286, indicates whether the column is an ascending order or descending order column.

Figure 4F:
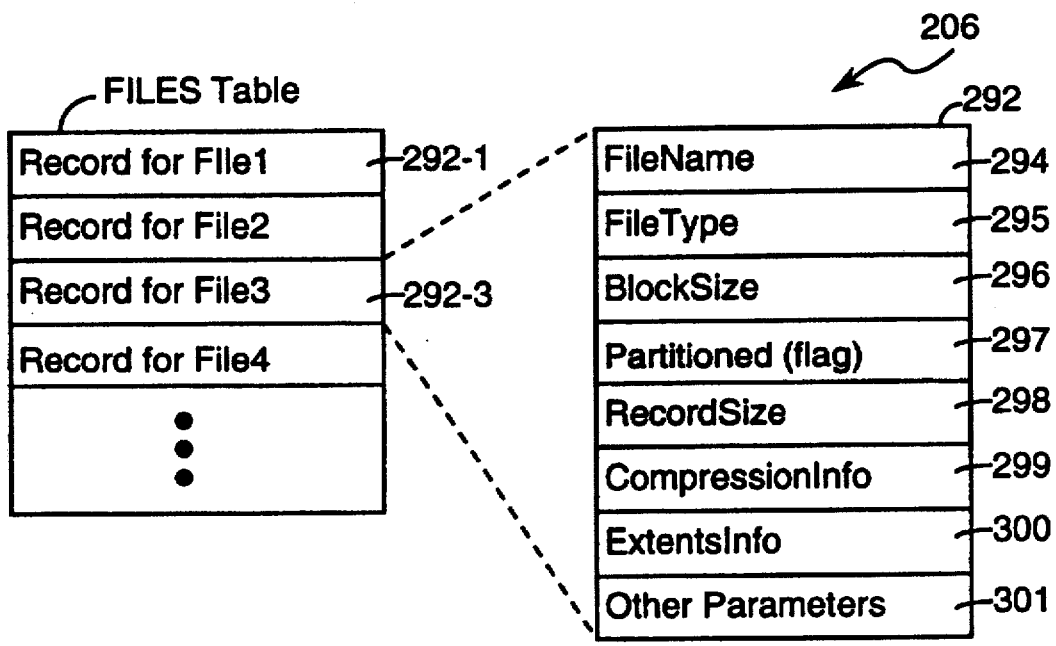

Referring to FIG. 4F, the Files table 206 includes one record 292 for each database table and index in the database server. Each record 292, representing characteristics of one database file, includes the following fields:

FileName 294, denoting the name of a database file, and corresponds to the FileName entry 235 in a BaseTables record 232 or an entry 272 in an Index record 262;

FileType 295, indicates how data within the file is sequenced (e.g., entry sequenced, key sequenced, etc.);

BlockSize 296, denotes the size of the secondary memory blocks (e.g., 512, 1024, 2048 or 4096 bytes) in which the file is stored;

Partitioned 297, is a flag (Y or N) indicating whether or not the file is partitioned;

RecordSize 298, denotes the maximum length of a record in the file;

CompressionInfo 299, is a flag (Y or N) value indicating whether data in the data pages and index pages of the file have been compressed;

ExtentsInfo 300, denotes the sizes of the primary and secondary extents and the maximum number of extents in the file; and other parameters 301 not relevant here.

When a file is partitioned, the Partitions table 214 will contain one record for each partition of the file indicating the partition name and catalog entry for each partition as well as the starting values for each column in the file's primary key.

Figure 4G:
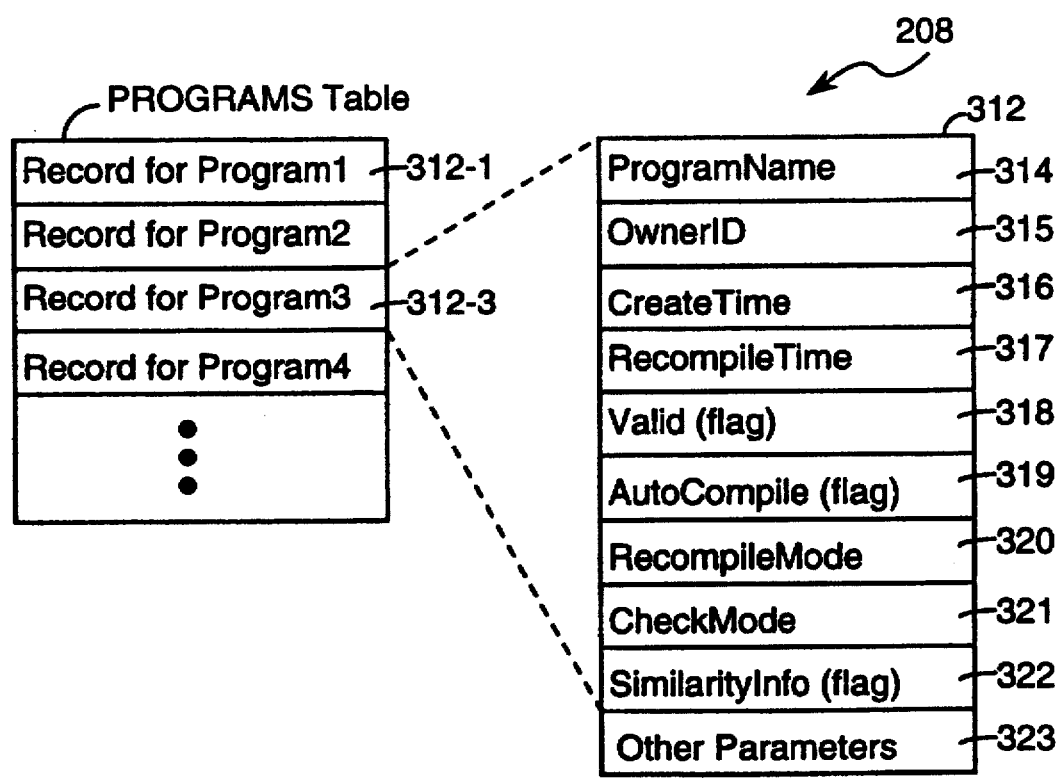

Referring to FIG. 4G, the Programs table 208 includes one record 312 for each registered program in the database server. Each record 312, representing characteristics of one program, includes the following fields:

ProgramName 314, denoting the name of a program;

OwnerID 315, identifies the program's owner;

CreateTime 316, is a timestamp value indicating when the program was first SQL compiled;

RecompileTime 317, is a timestamp value indicating when the program was last recompiled;

Valid 318, is a flag (Y or N) value indicating whether or not the program is valid;

AutoCompile 319, is a flag (Y or N) value indicating whether automatic recompilations of the program are allowed at run time, if required;

RecompileMode 320, is a mode value that is set to "All" or "OnDemand" and governs (in conjunction with the AutoCompile and CheckMode parameters) when program and statements within the program are recompiled, as explained in more detail below;

CheckMode 321, is a mode value that is set to "InvalidProgram," "InvalidPlans," or "InoperablePlans," and governs (in conjunction with the AutoCompile and RecompileMode parameters) when the program and statements within the program are recompiled;

SimilarityInfo 322, is a flag (Y or N) value indicating whether the compiled program includes similarity information for each of the program's compiled statements, where the similarity information for each statement consists of a subset of the schemas for database tables accessed by that statement; and other parameters 323 not relevant here.

Figure 4H:
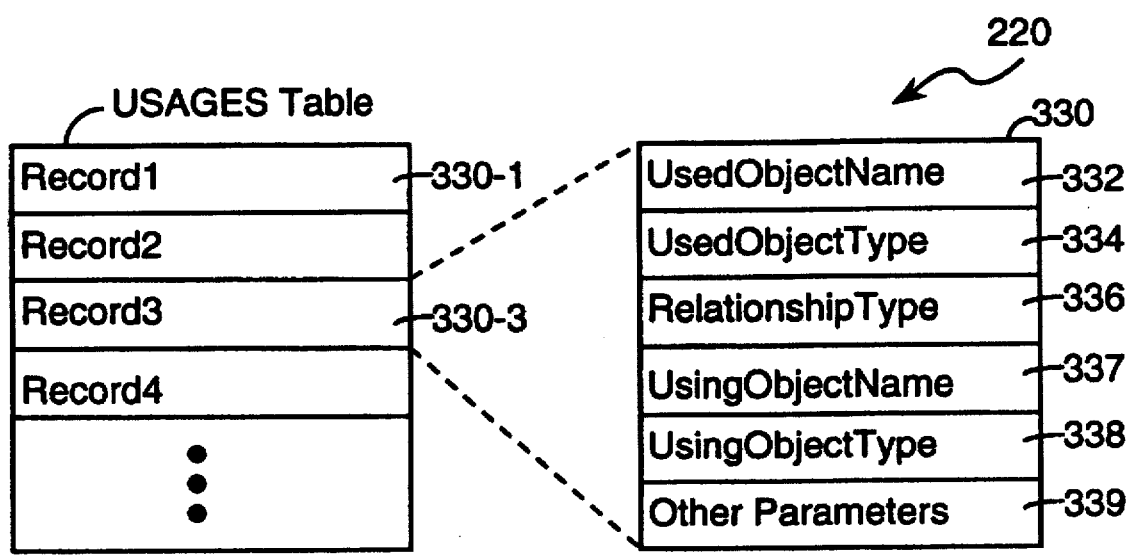

Referring to FIG. 4H, the Usages table 220 includes one record 330 for each usage of one object by another. The only usages relevant to this document are use of a database table by a compiled program. For each program that uses a database table there is a record 330, representing that relationship that includes the following fields:

UsedObjectName 332, identifies the name of the "used" object, which in the context of this document is the tablename of a database table;

UsedObjectType 334, identifies the type of the used object, which in this case is "table"; other defined object types for used objects are "view" and "index";

RelationshipType 336, is flag that is enabled if the using object depends on the used object;

UsingObjectName 337, identifies the name of the "using" object, which in the context of this document is the name of a program;

UsingObjectType 338, identifies the type of the using object, which in this case is "program"; other defined object types for using objects are "view" and "index"; and other parameters 339 not relevant here.

The following is an explanation how the RecompileMode and CheckMode parameters govern recompilations of a program by the SQL executor 124. When a program's CheckMode is equal to "CheckInvalidProgram" and RecompileMode is equal to "All" the SQL executor 124 rocompiles the entire program at SQL load time if the program is invalid. When a program's CheckMode is equal to "CheckInvalidProgram" and RecompileMode is equal to "OnDemand," the SQL executor 124 recompiles (if recompilation is needed) a statement the first time it is executed, thus binding the recompiled statements to specified database objects at that time.

When a program's CheckMode is equal to "CheckInvalidPlans" and RecompileMode is equal to "All," the SQL executor recompiles only invalid execution plans at SQL load time. When CheckMode is equal to "CheckInvalidPlans" and RecompileMode is equal to "OnDemand," the SQL executor rocompiles a statement the first time it is executed only if the corrosponding execution plan is invalid (i.e., at least one timestamp in the execution plan does not match the timestamp of a corrosponding object or the run time Define names for the execution plan do not match the compile time Define names).

When a program's CheckMode is equal to "CheckInoperablePlans" and RecompileMode is equal to "All," the SQL executor recompiles only inoperable execution plans at SQL load time. When CheckMode is equal to "CheckInoperablePlans" and RecompileMode is equal to "OnDemad" the SQL executor rocompiles a statement the first time it is executed only if the corrosponding execution plan is inoperable.

Parameters stored in the other catalog tables 210–220 are not directly relevant to the present invention, except as may be mentioned below.

Figures 5A, 5B:
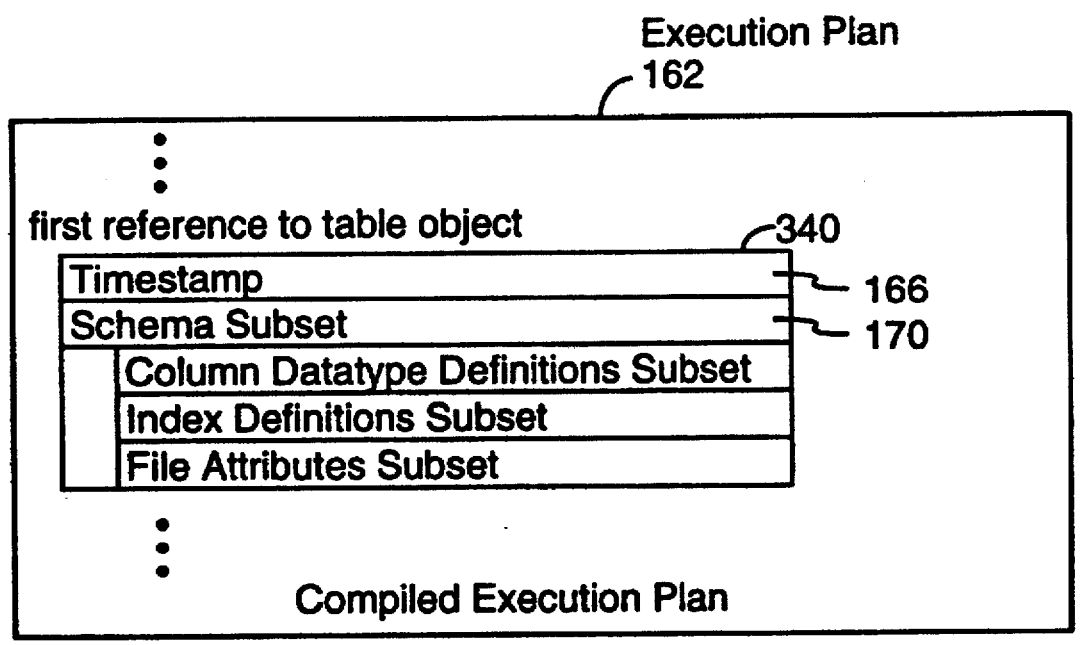
FIGS. 5A and 5B are block diagrams of data structures embedded in a compiled SQL program in the preferred embodiment.

Referring FIG. 5A, the runtime properties 164 stored in the disk label of each program are, in essence, a copy of the catalog record 312 for the program, except that it is stored in a more efficient format than the catalog record since the disk label is not for end user access. The program's disk label stores a copy of its runtime properties 164 for efficient access to that information by the SQL executor, such as for similarity comparisons performed during execution of the program.

Referring to FIG. 5B, each execution plan 162 includes at the locations in the plan at which each object is first referenced, an array 340 of object information that includes the following fields and substructure:

a timestamp 166 indicating the last time the corresponding object was last altered; and a schema subset 170, which consists in essence of a partial copy of the records in the Table, Column, Basetable, File, Index and Keys tables of the catalog for each object referenced by the execution plan.

The schema subset 170 stores information about all the aspects of the database tables to be accessed that must remain unchanged in order for the execution plan to be operable, as well as table and file identification information (i.e., the names of the tables and files) that can change without making the plan inoperable. The schema subset 170 represents the dependency of the plan on the schema of the referenced object.

Figure 6:
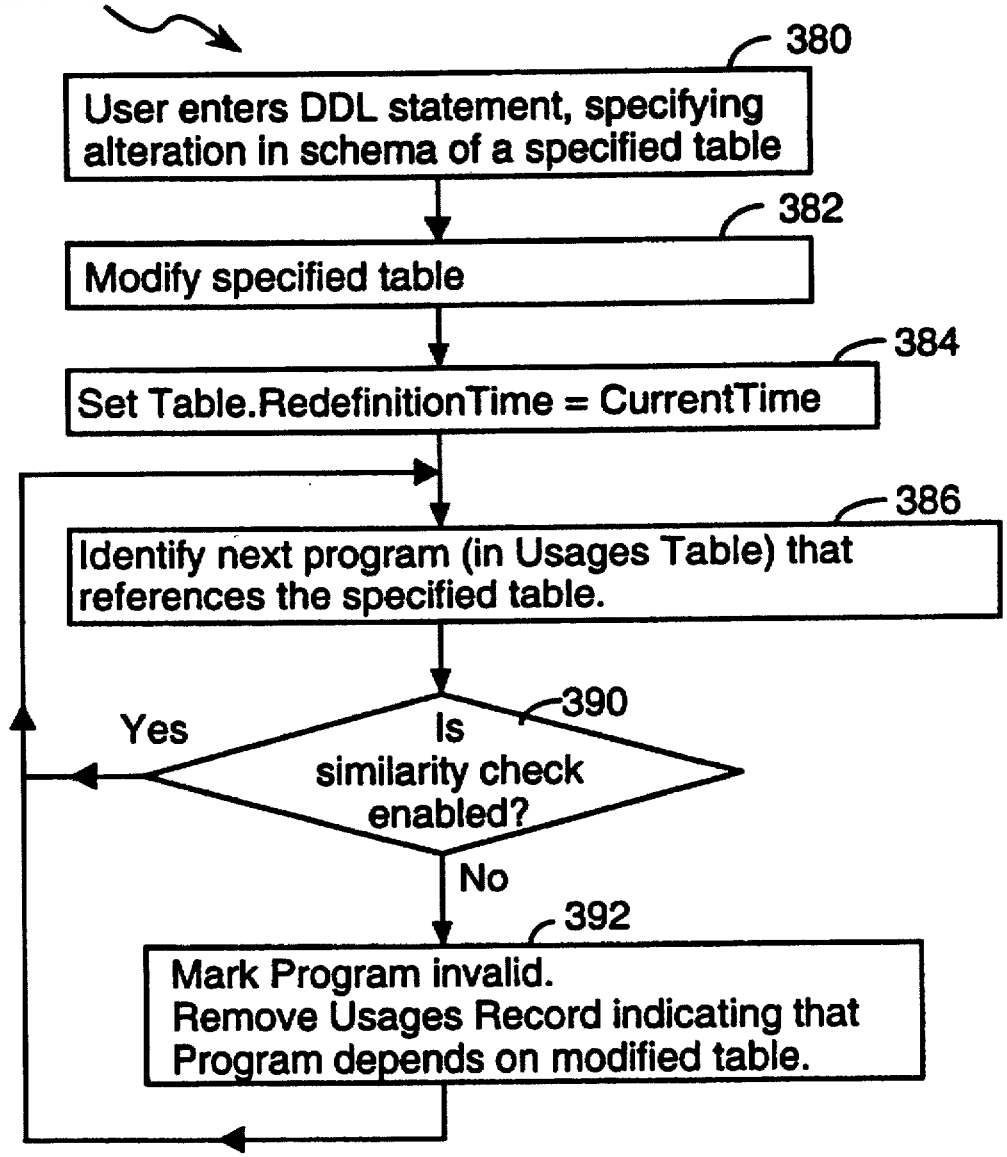
FIG. 6 is a flowchart of the procedure for modifying a database table.

Database Table Alteration Procedures and Procedures for Recompilation of Programs and Execution Plans FIG. 6 represents the procedure for modifying a database table. The commands for making database table alterations are called data definition language (DDL) statements. In the preferred embodiment, the syntax of the DDL statements is not changed, but rather the preferred embodiment of the present invention changes how the DBMS 123 (actually the SQL catalog manager 125 within the DBMS) determines which programs are to be invalidated when a DDL statement is executed.

The procedure for modifying a database table's structure begins with an operator entering a DDL statement (380), specifying an alteration in the schema of a specified database table. The specified database structure change is made (382), and a timestamp representing the current time (i.e., the time at which the database structure was modified) is stored (384) in database table's redefinition timestamp fields 228, 190 in both the catalog 126 and in the database table's disk label 180.

The Usages Table 220 includes records identifying all programs that use the modified table. At step 386, using the information in the Usages Table 220, a first program that uses the modified table is identified, if any such programs exist. At step 390 the similarity flags for both the database table (see SimilarityCheck field 229 in FIG. 4A) and the program (see CheckMode 321 and SimilarityInfo flag 322 in FIG. 4G) are checked to see if similarity checking is enabled for the program while using the modified table (i.e., the program's checkmode is equal to CheckInoperablePlans and the table° s SimilarityCheck is enabled). If similarity checking is enabled, the valid flag for the program is left unchanged, and the procedure proceeds at step 386 to look for the next program, if any, that uses the modified table.

If similarity checking is not enabled for either the program or the table (390), the program is marked invalid (392) in both the catalog and the program's file label, and the Usage Table record indicating the program's dependence on the modified table is deleted.

Figures 7, 7A:
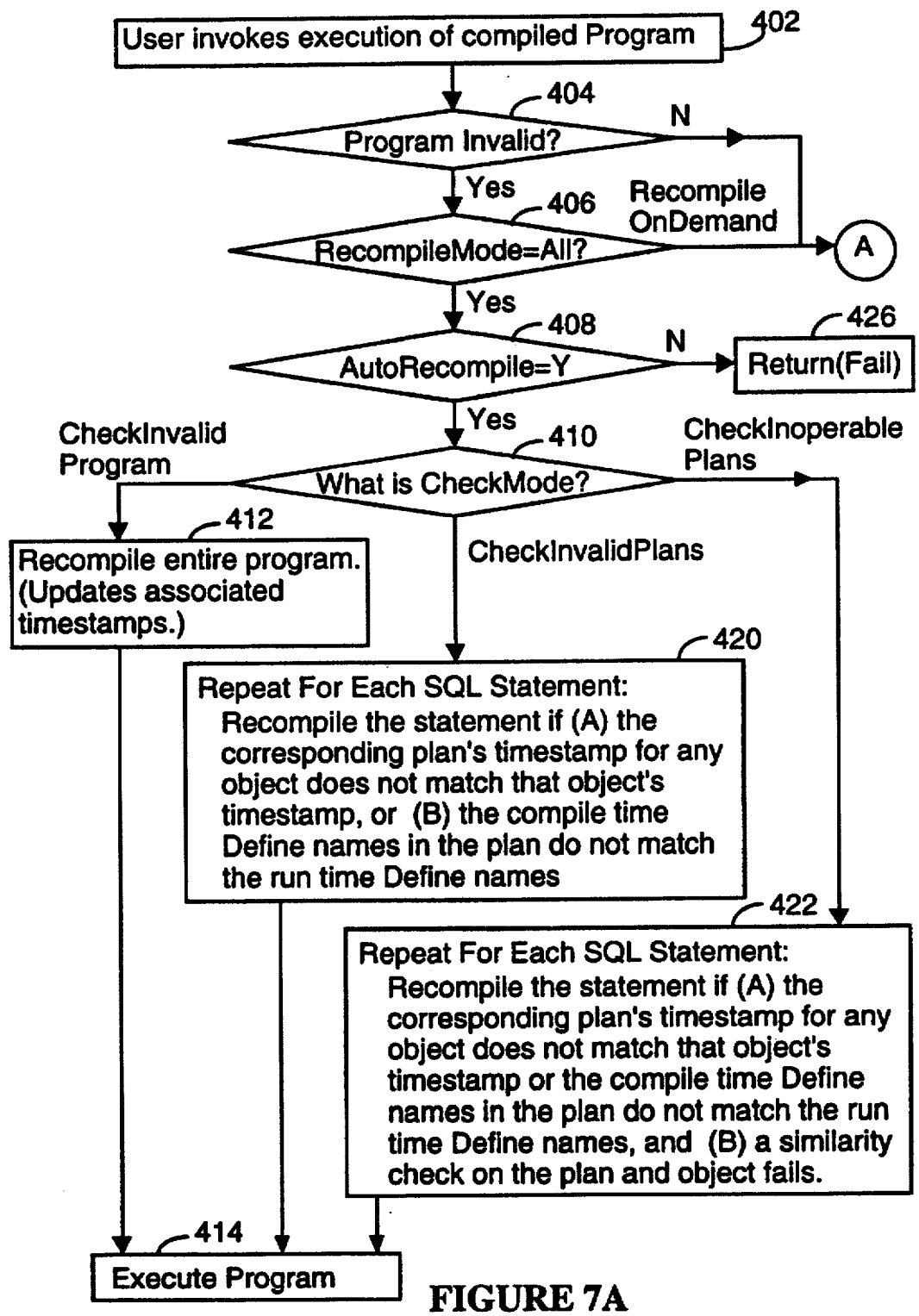
FIG. 7, comprising
FIGS. 7A and 7B are flowcharts of the procedure for executing a compiled program and for recompiling only those statements of the program which are inoperable.
Figure 7B:
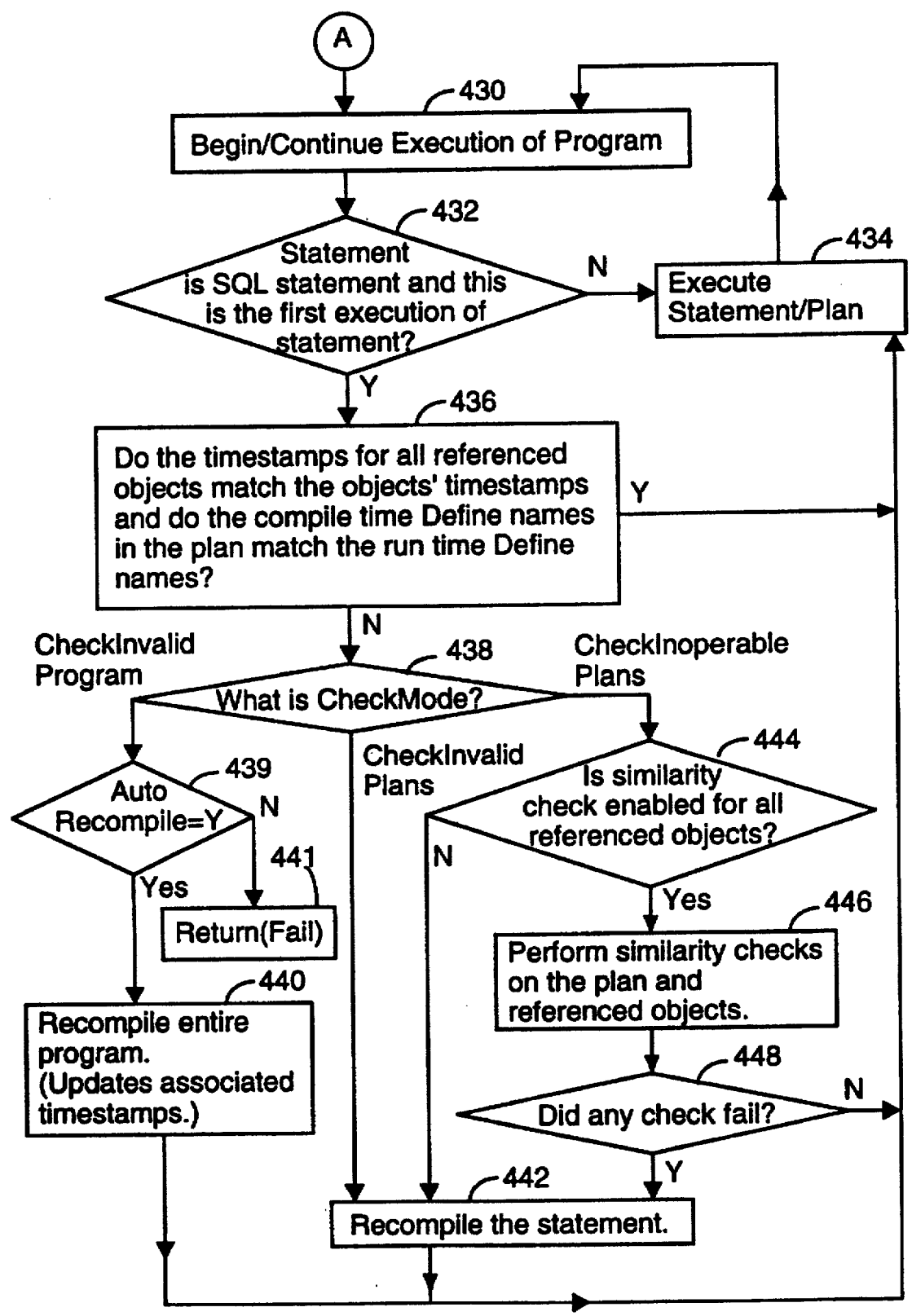

FIG. 7 is a flowchart of the procedure for recompiling only those statements of a program that are inoperable when the program is executed.

Appendix 1 lists a pseudocode representation of the similarity test procedure used by the SQL executor. The pseudocode used in Appendix 1 is, essentially, a computer language using universal computer language conventions. While the pseudocode employed here has been invented solely for the purposes of this description, it is designed to be easily understandable by any computer programmer skilled in the art.

The SQL program execution procedure starts when a user invokes a previously compiled SQL program (402). If the program has previously been marked invalid (404) and the Recompile Mode of the program is "All" (406) and the AutoRecompile flag for the program is set to "Yes" (408), the CheckMode for the program determines (410) which portions of the program will be recompiled prior to execution of the program.

If the program's CheckMode is "CheckInvalidProgram," then the entire program is recompiled (412) prior to execution of the program (414).

If the program's CheckMode is "CheckInvalidPlans," each SQL statement within the program is recompiled only if (A) the plan's timestamp for any object does not match that object's timestamp or (B) the compile time Define names in the plan do not match the run time Define names. All the SQL statements in the program are tested against these criteria and those that fail either test are recompiled (420) prior to execution of the program (414).

If the program's CheckMode is "CheckInoperablePlans," each SQL statement within the program is recompiled only if (A) the plan's timestamp for any object does not match that object's timestamp or the compile time Define names in the plan do not match the run time Define names, and (B) a similarity check on the plan and the object with the non-matching timestamp or non-matching Define names fails. All the SQL statements in the program are tested against these criteria and those that fail both tests are recompiled (422) prior to execution of the program (414).

If the program has previously been marked invalid (404) and the Recompile Mode of the program is "All" (406) and the AutoRecompile flag for the program is set to "No" (408), the program execution fails (426) because recompilation is disabled.

If either (A) the program had not previously been marked invalid (404) or (B) the Recompile Mode of the program is "Recompile On Demand", then execution of the program is initiated (430) at the first executable statement/plan in the program. If the statement currently being processed is either not an SQL statement or this is not the first execution of the SQL statement during execution of the program (432), the statement/plan is executed (434) and then the next statement in the program to be executed is processed (430).

If the statement being processed is an SOL statement and this is the first execution of the SOL statement during execution of the program (432), further checking of the statement is required. In particular, the timestamps in the SOL plan are compared with the timestamps for the corresponding objects and the compile time Define names in the plan are compared with the run time Define names (436). If all the plan's timestamps match the corresponding object timestamps and the run time Define names match the compile time Define names, the plan is executed (434) and then the next statement in the program to be executed is processed (430).

However, the plan's timestamp for any object does not match that object's timestamp or the compile time Define names in the plan do not match the run time Define names (436) then the CheckMode for the program determines (438) which portions of the program will be recompiled.

If the program's CheckMode is "CheckInvalidProgram," and automatic recompilations of the program are enabled (439), then the entire program is recompiled (440) prior to execution of the SQL plan currently being processed (434). If the program's CheckMode is "CheckInvalidProgram," and automatic recompilations of the program are not enabled (439), then program execution fails and an error message is generated (441).

If the program's CheckMode is "CheckInvalidPlans," the SQL statement currently being process is recompiled (442) prior to execution of the corresponding SQL plan (434).

If the program's CheckMode is "CheckInoperablePlans," the procedure determines whether or not similarity checks are enabled for all object referenced by the execution plan (430). In particular, a similarity check is enabled for a particular object if (A) the referenced database file's Table. SimilarityCheck flag is enabled (set to "Y"), (B) the program's Program. Similarityinfo flag is enabled. If a similarity check is not enabled with respect to any object referenced by the execution plan (444), the corresponding statement is recompiled (442) prior to execution of the statement/plan (434).

Each of the recompilation steps (412, 420, 422, 440, 442) includes updating the timestamps in the recompiled plans. In particular, the timestamps in the recompiled plans are set equal to the redefinition timestamps for the database objects to be accessed by the plans. Thus, if the last structural change to Table A was made at time T0, when each plan that accesses Table A is recompiled, the timestamp for Table A in each recompiled plan will be set to the timestamp corresponding to T0.

If a similarity check is enabled for all objects referenced by the execution plan (444), a similarity check is then performed (446) with respect to each referenced object for which either (A) the plan's timestamp object does not match that object's timestamp or (B) the compile time Define names in the plan do not match the run time Define names.

In particular, the similarity check procedure, represented in Appendix 1, compares the schema information (called the compile time table schema) embedded in the compiled execution plan with the schema information (called the run time table schema) in the file label for the database table.

The similarity test fails if:

1) any column in the Compile Time Table is not present in Run Time Table; or 2) any attribute, other than heading text and statistics, of any column in Compile Time Table is different in the Run Time Table; or 3) any of the following file attributes in the Compile Time Table are different in the Run Time Table: Filetype, Blocksize, DataPagesCompressed, IndexPagesCompressed; or 4) any of the keys and indices (other than their respective data values) in the Compile Time Table do not match those in the Run Time Table (where the Compile Time Schema Table references only those indices used in the execution plan).

If similarity check test does not fail, it is said to have passed.

In the preferred embodiment, any and all of the following characteristics of the Run Time Table can differ from that of the Compile Time Table without defeating the similarity check:

1) names of the tables;

2) contents of the tables (i.e., the data in the table);

3) table partitioning attributes (i.e., number of partitions and partitioning key ranges);

4) addition of indices to Run Time Tables. Run Time Tables must have all indices used by Compile Time Table in the execution plan, but can also have additional indices not present in the Compile Time Table;

5) data values of keys and indices;

6) creation timestamp and redefinition timestamp;

7) audit attributes;

8) the following file attributes: allocate, auditcompress, buffered, ClearOnPurge, Extent, LockLength, MaxExtents, NoPurgeUntil, Owner, Secure, TableCode, VerifiedWrites;

9) statistics on tables;

10) column headings (i.e., text labels used as default column label for reports and screen displays);

11) comments on columns, constraints, indices or tables;

12) catalog where table is registered; and 13) help text.

The above are characteristics of the object that are not relevant for proper execution of the plan.

If the similarity checks for all objects referenced by the plan pass (448), then the execution plan for the statement is executed (434) without recompilation, and the SQL executor proceeds with the processing of the next execution plan in the compiled program, if any.

If any of the similarity checks fail, the SQL statement is recompiled (442) prior to execution of the corresponding SQL plan (434).

In summary, the program execution procedure avoids recompilations of execution plans whenever the runtime database table and the compile time database table referenced by an execution plan meet predefined schema similarity criteria and similarity checking is enabled for both the program and the objects referenced by the program's SQL statements. When a recompilation is required, only the execution plans that do not meet the schema similarity criteria are recompiled if the compiled program has been assigned the appropriate CheckMode.

Similarity check testing can be disabled for any database table or for any program by appropriately setting the table's SimilarityCheck enabling flag 229 or program's runtime properties. In this way, a database table owner or program owner who believes that automatic recompilation, or that automatic piecemeal recompilation of a program are undesirable can prevent use of the high availability (i.e., partial) recompilation features of the present invention.

Similarly, a program owner can prevent use of the late binding features of the present invention by disabling both similarity checking and automatic recompilation of the program.

In the preferred embodiment, the compiler command options for controlling recompilations and similarity checks are as follows. The standard syntax definition of the compile command is as follows:

COMPILE [PROGRAM [STORE SIMILARITY INFO]
|INVALID PLANS|INOPERABLE PLANS][CHECK
[INVALID PROGRAM|INVALID
PLANS|INOPERABLE PLANS]]
[NORECOMPILE|RECOMPILEALL|RECOMPILE-
ONDEMAND]

In the standard syntax, items between hard brackets "[" and "]" are optional, and the symbol "|" represents the logical "OR" operation, thus indicating that no more than one of the options on either side of the OR symbol can be selected. Items in capital letters represent keywords, while items in italics represent parameters, such as file names, whose value depends on the objects being processed.

The "PROGRAM STORE SIMILARITY INFO" option causes schema information to be stored for each execution plan created by the compiler so that the COMPILE INVALID|INOPERABLE PLANS command may be used at a later time. The "INVALID PLANS" option commands the compiler to recompile only invalid plans (i.e., plans whose timestamp is not equal to the timestamp for the corresponding table). The "INOPERABLE PLANS" option commands the compiler to recompile only inoperable plans (i.e., plans which are invalid and whose compile time schema does not meet the similarity check test requirements with respect to the run time database table specified by the DEFINEs currently in use).

The CHECK INVALID PROGRAM option is the default, which enables automatic recompilation of the entire program if the program is marked invalid or references database objects different from the program's compile time database objects.

The CHECK INVALID PLANS option enables automatic run time recompilation of individual execution plans when (A) the plans are invalidated by alteration of the tables referenced by those execution plans, or (B) when the run time table referenced by the run time DEFINEs are different from the compile time table referenced in the plan's schema subset information 170.

The CHECK INOPERABLE PLANS option enables automatic run time recompilation of individual execution plans that are inoperable due to the run time and compile time tables for the execution plan not meeting predefined similarity check criteria. When this compiler option is used, an execution plan can access a run time table that is different from the compile time table without causing an automatic recompilation of the execution plan if the run time and compile time tables meet the similarity check criteria. Similarly, changes in the compile time table that do not alter any of the aspects of the table required for semantically correct execution of the plan will also not cause automatic recompilation of the execution plan when the program in which the plan resides is executed.

The similarity check enabling and disabling options in the DDL commands for creating and altering database tables are as follows:

CREATE TABLE table-name
 [SIMILARITY CHECK {ENABLE|DISABLE}]
ALTER TABLE table-name
 [SIMILARITY CHECK {ENABLE|DISABLE}]
where the SIMILARITY CHECK ENABLE option causes the database table's SimilarityCheck flag 229 to be enabled, and the SIMILARITY CHECK DISABLE option causes the database table's SimilarityCheck flag 229 to be disabled.

Figure 8:
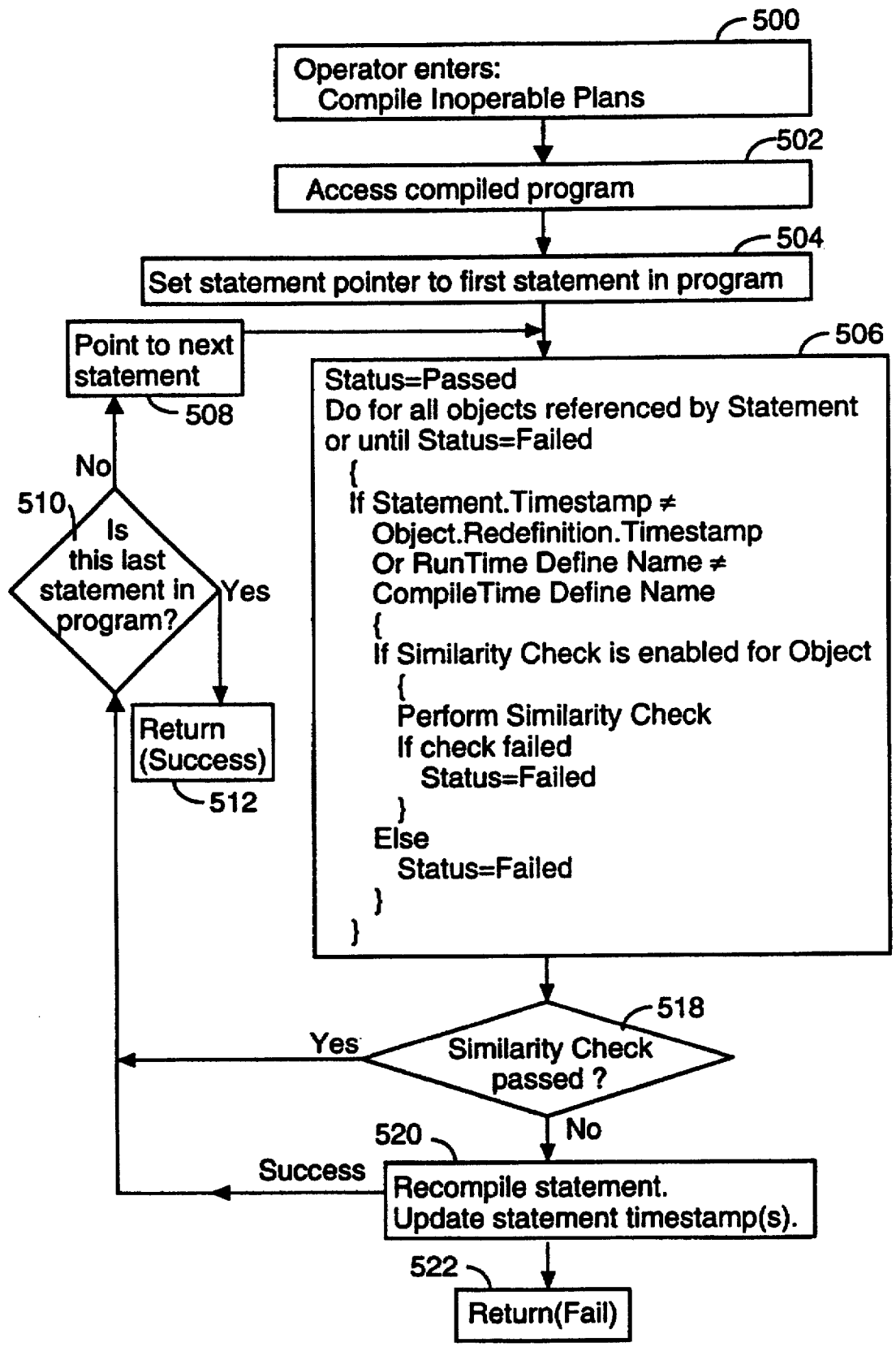
FIG. 8 is a flowchart of the procedure for performing a high availability recompilation of a program by recompiling only those statements of the program which are inoperable.

Referring to FIG. 8, the procedure for performing a high availability recompilation of a program, recompiling only those statements of the program which are inoperable, is as follows. An operator starts the process by entering a COMPILE INOPERABLE PLANS command (500).

The SQL compiler accesses the previously compiled program (502). A pointer is set to the first statement in the program (504). The following sequence of steps is performed for each statement in the program.

For all objects referenced by the execution plan (506), a similarity check is performed with respect to each referenced object for which either (A) the plan's timestamp object does not match that object's timestamp or (B) the compile time Define names in the plan do not match the run time Define names. If similarity checking is disabled or the similarity check fails for any object referenced by the plan having a nonmatching timestamp or Define names (518), the statement is recompiled (520). After the recompilation, the statement pointer is updated to point to the next statement in the program (508) unless the statement just processed was the last statement in the program (510), in which case the SQL compiler exits and returns a success code to the operator (512).

If every object referenced by the plan either (A) has matching timestamps and Define names or (B) passes the similarity check, the execution plan does not require recompilation (518) and the compiler proceeds (508, 510) with processing of the next execution plan in the compiled program, if any.

ALTERNATE EMBODIMENTS

The present invention is applicable to systems other than DBMS and SQL systems. In other implementations of the present invention, the objects referenced by compiled programs may be encapsulated computer resources (i.e., other than database tables) which the end user accesses indirectly through validated methods (i.e., programs) designed specifically to access those computer resources. In a system in which recompilation of the compiled programs is normally required upon alteration of the data structures within any of the objects referenced by the compiled programs, the methodology of the present invention may be used to minimize or avoid recompilations when the object alterations do not affect the operability of the compiled program. In addition, the similarity check test methodology of the present invention can be used to determine when a compiled programs can be used, without recompilation, to access objects other than the objects referenced by the program at compile time.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

---

APPENDIX 1
Pseudocode Representation of Compare Similarity Test

```
Similarity Check (Specified Program, Specified Statement, Specified Object)
{
Compare Object Schema Information in Statement for Compile Time Object
    (Compile Time Table) with Object Schema in Specified Object (Run
    Time Table)
    {
    If ( /*A*/   Any column in Compile Time Table is not present in Run
                Time Table, Or
         /*B*/  Any attribute, other than heading text and statistics, of any
                column in Compile Time Table is different in the Run Time
                Table, Or
         /*C*/  Any of the following file attributes in the Compile Time Table
                are different in the Run Time Table: Filetype, Blocksize,
                DataPagesCompressed, IndexPagesCompressed, Or
         /*D*/  Any of the keys and indices (other than their respective data
                values) in the Compile Time Table do not match those in the
                Run Time Table. /* Compile Time Table in Statements
                include only indices used in the execution plan */
    )
        Return (Fail)
    }
/*  The following characteristics of the Run Time Table can differ from that
of the Compile Time Table without defeating the similarity check:
1)  Names of the tables
2)  Contents of the tables (i.e., the data in the table)
3)  Table partitioning attributes (i.e., number of partitions and partitioning
    key ranges)
4)  Addition of indices to Run Time Tables. Run Time Tables must have all
    indices used by Compile Time Table in the execution plan, but can also
    have additional indices not present in the Compile Time Table.
5)  Data values of keys and indices
6)  Creation timestamp and redefinition timestamp
7)  Audit attribute
8)  File attributes: allocate, auditcompress, buffered, ClearonPurge, Extent,
    LockLength, MaxExtents, NoPurgeUntil, Owner, Secure, TableCode,
```

APPENDIX 1
Pseudocode Representation of Compare Similarity Test

VerfiedWrites
9) Statistics on tables
10) Column headings (i.e., text labels used as default column label for reports and screen displays)
11) Comments on columns, constraints, indices or tables
12) Catalog where table is registered
13) Help text
*/

What is claimed is:

1. A computer system for storing and providing user access to data in stored objects, comprising:
   memory for storing objects, each object having an associated schema denoting information about said object's internal structure;
   a first source code statement;
   a first execution plan, corresponding to said source code statement, for accessing specified ones of said stored objects, said first execution plan including schema information denoting a subset of said schema information for said specified objects at the time said first source code statement was last compiled;
   an object management system for executing user commands, including
      an object definition module, responsive to object definition commands, for defining and altering said schema for specified ones of said objects;
      a compiler for compiling source code statements so as to generate execution plans; and
      a compiled plan executer, which executes said execution plans in response to user commands so as to access ones of said objects, said compiled plan executer including:
         similarity comparison instructions for performing a predefined similarity test on said schema information for said execution plans and said schemas for said objects to be accessed by said execution plans;
         recompiling instructions, executed when said similarity test fails, for recompiling said source code statements; and
         plan execution instructions for executing said compiled statements, wherein said plan execution instructions are executed when said similarity test passes, and otherwise after recompilation of said corresponding source code statements.

2. The computer system of claim 1,
   each object furthering including a timestamp;
   each said execution plan including a timestamp for each object referenced by said each execution plan indicating said object's timestamp when the corresponding source code statement was last compiled;
   said compiled plan executer including:
      timestamp comparison instructions for comparing said timestamps in each execution plan to be executed with corresponding timestamps in said objects referenced by said each execution plan and for executing said recompilation instructions only when said compared timestamps do not match.

3. A computer system for storing and providing user access to data in stored objects, comprising:
   memory for storing objects, each object having an associated schema denoting information about said object's internal structure;
   a source code program including a plurality of source code statements;
   a compiled program, corresponding to said source code program, for accessing data within said stored objects, said compiled program including a plurality of compiled statements, each compiled statement including an execution plan for accessing specified ones of said objects, and schema information denoting a subset of said schema information for said specified objects at the time said statement was last compiled;
   an object management system for executing user commands, including
      an object definition module, responsive to object definition commands, for defining and altering said schema for specified ones of said objects;
      a program compiler for compiling said source code program so as to generate said compiled program, said program compiler including a statement compiler for compiling specified individual ones of said source code statements in said program; and
      a compiled plan executer, which executes said compiled program in response to user commands so as to access specified ones of said objects, said compiled plan executer including:
         similarity comparison instructions for performing a predefined similarity test on said schema information for said compiled statement and said schemas for said specified objects;
         recompiling instructions, executed when said similarity test fails, for recompiling said source code statement corresponding to said compiled statement for which said similarity test failed without recompiling other source code statements, in said source code program; and
         plan execution instructions for executing said compiled statement, wherein said plan execution instructions are executed when said similarity test passes, and otherwise after recompilation of said corresponding source code statement.

4. The computer system of claim 3,
   each object furthering including a timestamp;
   each compiled statement including a timestamp for each object referenced by said compiled statement indicating said object's timestamp when said statement was last compiled;
   said compiled plan executer including:
      timestamp comparison instructions for comparing said timestamps in each compiled statement to be executed with corresponding timestamps in said objects referenced by said each compiled statement and for executing said recompilation instructions only when said compared timestamps do not match.

5. A computer system for storing and providing user access to data in stored databases, comprising:

memory for storing said databases, said databases including database tables, each database table having a plurality of columns and an associated schema denoting information about said table's columns;

a source code program including a plurality of source code statements;

a compiled program, corresponding to skid source code program, for accessing data within said stored databases, said compiled program including a plurality of compiled statements, each compiled statement including an execution plan for accessing specified ones of said database tables, and schema information denoting a subset of said schema information for said specified database tables at the time said statement was last compiled;

a database management system for executing user commands, including
- a table definition module, responsive to database table definition commands, for defining and altering said schema for specified ones of said database tables;
- a program compiler for compiling said source code program so as to generate said compiled program, said program compiler including a statement compiler for compiling specified individual ones of said source code statements in said program; and
- a compiled plan executer, which executes said compiled program in response to user commands so as to access specified ones of said database tables, said compiled plan executer including:
  - similarity comparison instructions for performing a predefined similarity test on said schema information for said compiled statement and said schemas for said specified database tables;
  - recompiling instructions, executed when said similarity test fails, for recompiling said source code statement corresponding to said compiled statement for which said similarity test failed without recompiling other source code statements in said source code program; and
  - plan execution instructions for executing said compiled statement, wherein said plan execution instructions are executed when said similarity test passes, and otherwise after recompilation of said corresponding source code statement.

6. The computer system of claim 5, each database table furthering including a timestamp;

each compiled statement including a timestamp for each database table referenced by said compiled statement indicating said database table's timestamp when said statement was last compiled;

said compiled plan executer including:
- timestamp comparison instructions for comparing said timestamps in each compiled statement to be executed with corresponding timestamps in said database tables referenced by said each compiled statement and for executing said recompilation instructions only when said compared timestamps do not match.

7. A computer system for storing and providing user access to data in stored objects, comprising:

memory for storing objects, each object having an associated timestamp and an associated schema denoting information about said object's internal structure;

an object management system for executing user commands, including:

an object definition module, responsive to object definition commands, for defining and altering said schema for specified ones of said objects and for updating each object's associate timestamp to indicate when said object was last defined or altered;

a compiler for compiling source code statements so as to generate execution plans; each execution plan corresponding to one of said source code statements, for accessing a compile-time specified set of said stored objects, each execution plan including schema information denoting a subset of said schema information for said compile-time specified objects at the time said corresponding source code statement was last compiled; each said execution plan including a timestamp for each object referenced by said each execution plan indicating said object's timestamp value when the corresponding source code statement was last compiled; and a compiled plan executer, which executes said execution plans in response to user commands so as to access a run-time specified set of said objects, said compiled plan executer including:
- similarity comparison instructions for performing a predefined similarity test on said schema information for said execution plans and said schemas for said objects to be accessed by said execution plans;
- object identity and timestamp comparison instructions for comparing said run-time specified set of objects with said compile-time specified set of objects for each execution plan to be executed, and comparing said timestamps in each execution plan to be executed with the corresponding timestamps in said run-time specified set of objects, and for executing said similarity comparison instructions only when said sets of objects do not match or said compared timestamps do not match;
- recompiling instructions, executed when said similarity test fails, for recompiling said source code statements; and
- plan execution instructions for executing said compiled statements, wherein said plan execution instructions are executed when said similarity test passes, and otherwise after recompilation of said corresponding source code statements.

8. A method of storing and providing user access to data in stored objects, said method comprising the steps of:

(a) storing in a memory one or more objects, each object having an associated schema denoting information about said object's internal structure;

(b) obtaining a source code program including at least one source code statement;

(c) compiling said source code program into a compiled program including at least one compiled statement, each compiled statement including an execution plan for accessing a compile-time specified set of said objects and including compile-time schema information denoting a subset of said schema information for said compile-time specified set of objects;

(d) modifying one or more of said objects so as to modify said schema associated with the modified objects;

(e) specifying a run-time set of objects to use when executing a selected one of said compiled statements;

(f) recompiling said selected compiled statement when said schema information for said selected compiled statement and said schemas for said run-time specified set of objects do not meet predefined similarity criteria.

9. The method of claim 8,
wherein said step (f) is are performed automatically during an initial execution of each compiled statement in said compiled program.

10. The method claim 8,
wherein said step (f) is performed automatically before executing said compiled program.

11. The method of claim 8,
each of said objects including a timestamp;
each of said execution plans including a timestamp for each of said compile-time specified objects referenced by said execution plan indicating each said object's timestamp when the corresponding source code statement was last compiled; and
wherein said step (f) is performed, for each execution plan having at least one object whose execution plan timestamp does not match said object's timestamp.

12. A method of storing and providing user access to data in stored objects, said method comprising the steps of:

(a) storing in a memory one or more objects, each object having an associated timestamp and an associated schema denoting information about said object's internal structure;

(b) obtaining one or more source code statements;

(c) compiling said source code statements into execution plans; each execution plan corresponding to one of said source code statements, for accessing a compile-time specified set of said stored objects, each execution plan including schema information denoting a subset of said schema information for said compile-time specified objects at the time said corresponding source code statement was last compiled; each said execution plan including a timestamp for each object referenced by said each execution plan indicating said object's timestamp when the corresponding source code statement was last compiled;

(d) defining and altering said schema for specified ones of said objects and for updating each object's associate timestamp to indicate when said object was last defined or altered; and (e) executing said execution plans in response to user commands so as to access a run-time specified set of said objects, including:
comparing said run-time specified set of objects with said compile-time specified set of objects for each execution plan to be executed, and comparing said timestamps in each execution plan to be executed with the corresponding timestamps in said run-time specified set of objects;
when said sets of objects do not match and when said compared timestamps do not match, performing a predefined similarity test on said schema information for said execution plans and said schemas for said objects to be accessed by said execution plans;
when said similarity test fails, recompiling said source code statements to generate updated execution plans; and
executing each execution plan without recompilation of the corresponding source code statement when said similarity test passes, and otherwise executing each execution plan after recompilation of the corresponding source code statement.

13. A method of storing and providing user access to data in stored objects, said method comprising the steps of:

(a) storing in a memory one or more objects, each object having an associated schema denoting information about said object's internal structure and having a timestamp;

(b) obtaining a source code program including at least one source code statement;

(c) compiling said source code program to generate a compiled program, including compiling each source code statement in said source code program into a corresponding execution plan for accessing a compile-time specified set of said stored objects, each execution plan including schema information denoting a subset of said schema information for said compile-time specified objects at the time said corresponding source code statement was last compiled; each said execution plan including a timestamp for each object referenced by said each execution plan indicating said object's timestamp when the corresponding source code statement was last compiled;

(d) obtaining a user-recompilation directive for use in directing automatic recompilation of said compiled program, or automatic recompilation of a subset of the source code statements therein;

(e) initiating execution of said compiled program;

(f) when said user-recompilation directive indicates recompilation of said entire source code program if any execution plan therein is invalid,
analyzing said execution plans in said compiled program prior to executing any of said execution plans; and
determining if any of said execution plans contain a timestamp for an object that does not match said object's current timestamp, and when such a determination is made, recompiling said source code program to generate a new compiled program prior to executing any of said execution plans therein;

(g) when said user-recompilation directive indicates recompilation of each execution plan in said compiled program that is invalid,
analyzing each said execution plan in said compiled program prior to a first execution of that execution plan; and
determining if said execution plan contains a timestamp for an object that does not match said object's current timestamp, and when such a determination is made, recompiling the corresponding source code statement to generate a new execution plan, and then executing said new execution plan; and (h) when said user-recompilation directive indicates recompilation of each execution plan in said compiled program that is inoperable,
analyzing each said execution plan in said compiled program prior to a first execution of that execution plan; and
determining if said execution plan contains a timestamp for an object that does not match said object's current timestamp, and when such a determination is made, performing a predefined similarity test on said schema information for said execution plan and said schemas for said objects to be accessed by said execution plan;
when said similarity test fails for a particular execution plan, recompiling the corresponding source code statement to generate a new execution plan for said corresponding source code statement; and
executing each execution plan in said compiled program without recompilation of the corresponding source code statement when said timestamps match or said similarity test passes, and otherwise executing each execution plan after recompilation of the corresponding source code statement.

14. The method of claim 13,
wherein each of said objects represent a database including one or more database tables.

15. The method of claim 13,
each of said objects further including a similarity check enable flag that when enabled indicates that programs and execution plans referencing said object are eligible for automatic recompilation when execution of said programs and execution plans is initiated, and that when disabled indicates that programs and execution plans referencing said object are not eligible for automatic recompilation when execution of said programs and execution plans is initiated.

16. A method of storing and providing user access to data in stored objects, said method comprising the steps of:
(a) storing in a memory one or more objects, each object having an associated schema denoting information about said object's internal structure and having a timestamp;
(b) obtaining a source code program including at least one source code statement;
(c) compiling said source code program to generate a compiled program, including compiling each source code statement in said source code program into a corresponding execution plan for accessing a compile-time specified set of said stored objects, each execution plan including schema information denoting a subset of said schema information for said compile-time specified objects at the time said corresponding source code statement was last compiled; each said execution plan including a timestamp for each object referenced by said each execution plan indicating said object's timestamp when the corresponding source code statement was last compiled;
(d) obtaining a user-recompilation directive for use in directing automatic recompilation of said compiled program, or automatic recompilation of a subset of the source code statements therein;
(e) initiating execution of said compiled program so as to access a run-time specified set of said objects;
(f) when said user-recompilation directive indicates recompilation of said entire source code program if any execution plan therein is invalid,
analyzing said execution plans in said compiled program prior to executing any of said execution plans, including determining whether any of said execution plans contain a timestamp for an object that does not match said object's current timestamp, and determining whether for any of said execution plans said run-time specified set of objects does not match said compile-time specified set of objects, and when either determination is made for at least one execution plan in said compiled program, recompiling said source code program to generate a new compiled program prior to executing any of said execution plans therein;
(g) when said user-recompilation directive indicates recompilation of each execution plan in said compiled program that is invalid,
analyzing each said execution plan in said compiled program prior to a first execution of that execution plan, including comparing said run-time specified set of objects with said compile-time specified set of objects for said execution plan, and comparing said timestamps in said execution plan with the corresponding timestamps in said run-time specified set of objects;
and when sets of objects do not match and when said compared timestamps do not match with respect to a particular execution plan, recompiling the corresponding source code statement to generate a new execution plan, and then executing said new execution plan; and
(h) when said user-recompilation directive indicates recompilation of each execution plan in said compiled program that is inoperable,
prior to a first execution of each said execution plan comparing said run-time specified set of objects with said compile-time specified set of objects for said execution plan, and comparing said timestamps in said execution plan with the corresponding timestamps in said run-time specified set of objects;
when said sets of objects do not match and when said compared timestamps do not match, performing a predefined similarity test on said schema information for said execution plan and said schemas for said objects to be accessed by said execution plan;
executing each execution plan in said compiled program without recompilation of the corresponding source code statement when said timestamps match and said run-time and compile-time specified sets of object match or said similarity test passes, and otherwise executing each execution plan after recompilation of the corresponding source code statement.

17. The method of claim 16,
wherein each of said objects represent a database including one or more database tables.

18. The method of claim 16,
each of said objects further including a similarity check enable flag that when enabled indicates that programs and execution plans referencing said object are eligible for automatic recompilation when execution of said programs and execution plans is initiated, and that when disabled indicates that programs and execution plans referencing said object are not eligible for automatic recompilation when execution of said programs and execution plans is initiated.

19. A method for storing and providing user access to data in stored objects, said method comprising the steps of:
(a) storing in a memory one or more objects, each object having an associated schema denoting information about said object's internal structure and having a timestamp;
(b) obtaining a source code program including at least one source code statement;
(c) compiling said source code program to generate a compiled program, including compiling each source code statement in said source code program into a corresponding execution plan for accessing a first compile-time specified set of said stored objects, each execution plan including schema information denoting a subset of said schema information for said first compile-time specified objects at the time said corresponding source code statement was last compiled; each said execution plan including a timestamp for each object referenced by said each execution plan indicating said object's timestamp when the corresponding source code statement was last compiled;
(d) obtaining a user-recompilation directive to recompile said compiled program or recompile of a subset of the source code statements therein with respect to a second compile-time specified set of said stored objects;
(e) when said user-recompilation directive indicates recompilation of each execution plan in said compiled program that is invalid, for each said execution plan in said compiled program performing the steps of:

comparing said second compile-time specified set of objects with said first compile-time specified set of objects for said execution plan, and comparing said timestamps in said execution plan with the corresponding timestamps in said second compile-time specified set of objects; and when said sets of objects do not match and when said compared timestamps do not match, recompiling the corresponding source code statement to generate a new execution plan; and (h) when said user-recompilation directive indicates recompilation of each execution plan in said compiled program that is inoperable, for each said execution plan in said compiled program performing the steps of:

comparing said second compile-time specified set of objects with said first compile-time specified set of objects for said execution plan, and comparing said timestamps in said execution plan with the corresponding timestamps in said second compile-time specified set of objects;

when said sets of objects do not match and when said compared timestamps do not match, performing a predefined similarity test on said schema information for said execution plan and said schemas for said second compile-time set of objects; and recompiling said execution plan when said similarity test fails.

20. The method of claim 19, wherein each of said objects represent a database including one or more database tables.

21. A memory for storing data and programs that access the stored data while being executed by a computer system, the memory comprising:

an object management system for executing user commands, including:

an object definition module, responsive to object definition commands, for defining and altering objects, each object having an associated timestamp and an associated schema denoting information about said object's internal structure, said object definition module including instructions for altering said schema for specified ones of said objects and for updating each object's associate timestamp to indicate when said object was last defined or altered;

a compiler for compiling source code statements so as to generate execution plans; each execution plan corresponding to one of said source code statements, for accessing a compile-time specified set of said stored objects, each execution plan including schema information denoting a subset of said schema information for said compile-time specified objects at the time said corresponding source code statement was last compiled; and a compiled plan executer, which executes said execution plans in response to user commands so as to access a run-time specified set of said objects, said compiled plan executer including:

similarity comparison instructions for performing a predefined similarity test on said schema information for said execution plans and said schemas for said objects to be accessed by said execution plans;

recompiling instructions, executed when said similarity test fails, for recompiling said source code statements; and plan execution instructions for executing said compiled statements, wherein said plan execution instructions are executed when said similarity test passes, and otherwise after recompilation of said corresponding source code statements.

22. The memory of claim 21, each said execution plan including a timestamp for each object referenced by said each execution plan indicating said object's timestamp when the corresponding source code statement was last compiled; and said compiled plan executer including:

object identity and timestamp comparison instructions for comparing said run-time specified set of objects with said compile-time specified set of objects for each execution plan to be executed, and comparing said timestamps in each execution plan to be executed with the corresponding timestamps in said run-time specified set of objects, and for executing said similarity comparison instructions only when said sets of objects do not match or said compared timestamps do not match.

23. The memory of claim 22, wherein each of said objects represent a database including one or more database tables.

24. The memory of claim 21, wherein each of said objects represent a database including one or more database tables.

* * * * *

UNITED STATES PATENT AND TRADEMARK OFFICE
CERTIFICATE OF CORRECTION

PATENT NO.   : 5,717,911
DATED        : February 10, 1998
INVENTOR(S)  : Louise M. Madrid et al.

It is certified that error appears in the above-identified patent and that said Letters Patent is hereby corrected as shown below:

Column 19,
Line 7, delete "skid" and insert therefor -- said --

Column 21,
Line 2, after "is" delete "are"

Signed and Sealed this

Third Day of May, 2005

JON W. DUDAS
*Director of the United States Patent and Trademark Office*